(12) United States Patent
Oka et al.

(10) Patent No.: US 6,891,544 B2
(45) Date of Patent: May 10, 2005

(54) GAME SYSTEM WITH GRAPHICS PROCESSOR

(75) Inventors: Masaaki Oka, Tokyo (JP); Akio Ohba, Tokyo (JP); Masayoshi Tanaka, Tokyo (JP)

(73) Assignee: Sony Computer Entertainment Inc. (JP)

( * ) Notice: Subject to any disclaimer, the term of this patent is extended or adjusted under 35 U.S.C. 154(b) by 0 days.

(21) Appl. No.: 10/694,482

(22) Filed: Oct. 27, 2003

(65) Prior Publication Data

US 2004/0085321 A1 May 6, 2004

Related U.S. Application Data

(63) Continuation of application No. 09/502,671, filed on Feb. 11, 2000, now Pat. No. 6,807,620.

(51) Int. Cl.⁷ .................................................. G09G 5/36
(52) U.S. Cl. ...................................................... 345/545
(58) Field of Search ............................... 345/501, 530, 345/545, 519, 531, 418

(56) References Cited

U.S. PATENT DOCUMENTS

| | | |
|---|---|---|
| 4,949,280 A | 8/1990 | Littlefield |
| 5,129,060 A | 7/1992 | Pfeiffer et al. |
| 5,136,664 A | 8/1992 | Bersack et al. |
| 5,303,334 A * | 4/1994 | Snyder et al. ............... 345/629 |
| 5,319,606 A | 6/1994 | Bowen et al. |
| 5,467,459 A | 11/1995 | Alexander et al. |
| 5,477,242 A * | 12/1995 | Thompson et al. .......... 345/531 |
| 5,712,664 A * | 1/1998 | Reddy .......................... 345/519 |
| 5,724,560 A | 3/1998 | Johns et al. |
| 5,900,887 A | 5/1999 | Leung et al. |
| 5,977,997 A | 11/1999 | Vainsencher |
| 5,995,111 A | 11/1999 | Morioka et al. |
| 6,259,431 B1 | 7/2001 | Futatsugi et al. |
| 6,366,272 B1 | 4/2002 | Rosenberg et al. |
| 6,384,833 B1 | 5/2002 | Denneau et al. |
| 6,485,369 B2 | 11/2002 | Kondo et al. |
| 6,570,571 B1 | 5/2003 | Morozumi |
| 6,646,653 B2 | 11/2003 | San et al. |

FOREIGN PATENT DOCUMENTS

| | | |
|---|---|---|
| CA | 1198523 | 12/1985 |
| CA | 1304509 | 6/1992 |

(Continued)

OTHER PUBLICATIONS

Ken Kutaragi, et al., "A Microprocessor with a 128b CPU, 10 Floating–Point MACs, 4 Floating–Point Dividers, and an MPEG2 Decoder," 1999 IEEE International Solid–State Circuits Conference, Feb. 15–17, 1999, 1999 Digest of Technical Papers, vol. 42.

(Continued)

Primary Examiner—Kee M. Tung
(74) Attorney, Agent, or Firm—Lerner, David, Littenberg, Krumholz & Mentlik, LLP

(57) ABSTRACT

The present invention relates to the architecture and use of a computer system optimized for the efficient modeling of graphics. The computer system has a primary processor and a graphics processor. The primary processor has two vector processor units within it, one which is closely connected to central processor unit. Simultaneously performing complex modeling calculations on the first vector processor and CPU, and geometry transformation calculations on the second vector processor, allows for efficient modeling of graphics. Furthermore, the graphics processor is optimized to rapidly switch between data flows from the two vector processors. In addition, the graphics processor is able to render many pixels simultaneously, and has a local memory on the graphics processor chip that acts as a frame buffer, texture buffer, and z buffer. This allows a high fill rate to the frame buffer.

10 Claims, 12 Drawing Sheets

FOREIGN PATENT DOCUMENTS

| | | |
|---|---|---|
| CA | 2178454 | 12/1996 |
| EP | 0 715277 A2 | 6/1996 |
| EP | 0 715279 A2 | 6/1996 |
| EP | 0 867809 | 9/1998 |
| EP | 0 871142 | 10/1998 |
| JP | 9035084 | 2/1997 |
| JP | 10003466 | 1/1998 |

OTHER PUBLICATIONS

Ken Kutaragi, et al., "A Microprocessor with a 128b CPU, 10 Floating–Point MACs, 4 Floating–Point Dividers, and an MPEG2 Decoder," 1999 IEEE International Solid–State Circuits Conference, Feb. 15–17, 1999, Slide Supplement 1999 to the Digest of Technical Papers, vol. 42.

Masaaki Oka, et al., "Designing and Programming the Emotion Engine," IEEE Micro, Nov./Dec. 1999, vol. 19, No. 6, pp. 20–28.

Keith Diefendorff, "Sony's Emotionally Charged Chip," Microprocessor Report, Apr. 19, 1999, vol. 13, No. 5, pp. 1, 6–11.

Masakazu Suzuoki, et al., "A Microprocessor with a 128–Bit CPU, Ten Floating–Point MAC's, Four Floating–Point Dividers, and an MPEG–2 Decoder," IEEE Journal of Solid–State Circuits, Nov. 1999, vol. 34, No. 11, pp. 1608–1618.

"Sony Computer Entertainment Announces the Development of an I/O Processor for the Next Generation Playstation that Provides 100% Backwards Compatibility," Sony Computer Entertainment Inc. press release, Mar. 2, 1999, Tokyo.

"Sony Computer Entertainment Announces the Design of the Next Generation Playstation System," Sony Computer Entertainment Inc. press release, Mar. 2, 1999, Tokyo.

"Sony Computer Entertainment Announces the Development of the World's Fastest Graphics Rendering Processor Using Embedded Dram Technology," Sony Computer Entertainment Inc. press release, Mar. 2, 1999, Tokyo.

"Sony Computer Entertainment Announces the World's Fastest 128 Bit CPU 'Emotion Engine TM' for the Next Generation Playstation," Sony Computer Entertainment Inc. press release, Mar. 2, 1999, Tokyo.

* cited by examiner

GAME SYSTEM WITH GRAPHICS PROCESSOR

CROSS-REFERENCE TO RELATED APPLICATIONS

This is a continuation of U.S. patent application Ser. No. 09/502,671 filed Feb. 11, 2000 U.S. Pat. No. 6,807,620, which is herein incorporated by reference.

FIELD OF THE INVENTION

The present invention relates to computer system architectures. More particularly, the present invention relates to the architecture and use of a computer system optimized for efficient modeling of graphics.

BACKGROUND OF THE INVENTION

High resolution, real time computer graphics are an important aspect of computer systems, particularly simulators (such as flight simulators) and game machines. Computer games, in particular, involve a great deal of computer graphics. Computer systems used as game machines, therefore, must handle far more computer graphics than a standard business computer used primarily for word processing or similar applications.

The game developer is faced with many limitations. He or she often wants realistic, highly detailed graphics. Prior art game machines, however, make the implementation of such graphics difficult. High resolution graphics are computationally expensive and difficult to render in the time required by a fast moving game. Current graphics co-processors, if implemented at all in game consoles, have difficulty supplying the bandwidth necessary to render high resolution, real time graphics.

Prior art game machines also do not permit easy behavioral and physical modeling of game objects. Many objects in a game would be more realistically rendered if their position and shape could be calculated, or modeled, under a set of rules or equations. However, such modeling is computationally expensive, requiring many floating point operations, and the standard CPU is not optimized for such calculations.

Prior art game machines also cannot easily deal with compressed video data. As game developers code larger and larger game worlds, they are in danger of running out of space in removable media. The use of compression techniques to store various kinds of data, such as graphics data, is limited by the need to decompress such data quickly for use in a real time, interactive game.

Prior art game machines also are generally restricted to gaming applications. Given the increasing computational power of gaming systems, developers are looking at other applications for game consoles besides gaming. However, limitations in input and output interfaces render such applications difficult.

SUMMARY OF THE INVENTION

The present invention provides an improved computer system particularly suited for simulators and game machines. The system includes a new computer architecture for such devices. This architecture comprises a main processor and a graphics processor. The main processor contains two co-processors for geometry modeling and a central processing unit(CPU).

In one aspect, the present invention provides a frame buffer and rendering system on the same integrated chip. This structure enables the computer system to draw many pixels in parallel to the frame buffer at a very high fill rate (high band width). As a result, the computer system can provide quick renderings of screen images at a high resolution.

In another aspect, the present invention provides a main processor with a 128-bit bus throughout this processor connecting all co-processors and a memory system. This structure enables the passing of data and instructions quickly from component to component, thereby improving bandwidth resolution and speed.

In another aspect, the present invention provides sub-processors with four floating-point, multiply-add arithmetic logic units (ALUs). These four ALUs enable the processing of four 32-bit operations simultaneously from the data of two 128-bit registers. This structure, therefore, enables parallel, 128-bit floating point calculations through parallel pipelining of similar calculations to, e.g., assist in modeling and geometry transformations.

The present invention, in a preferred embodiment, further provides a multimedia instruction set using 128 bit wide integer registers in parallel. This structure enables the handling of different size integers in parallel (64-bits×2, or 32-bits×4, or 16-bits×8 or 8-bits×16).

In yet another aspect, the present invention provides two geometry engines feeding in parallel into one rendering engine. One geometry engine preferably consists of the CPU, for flexible calculations, tightly coupled to a vector operation unit as a co-processor, for complex irregular geometry processing such as modeling of physics or behavior. The second geometry engine preferably is a programmable vector operation unit for simple, repetitive geometry processing such as background and distant views (simple geometrical transformations).

In accordance with this aspect of the invention, each geometry engine preferably provides data (termed display lists) that are passed to the rendering engine. Arbitrator logic between the geometry engines and the rendering engine determines the order in which these data are passed to the rendering engine. The second geometry engine preferably is given priority over the first, as the second geometry engine generally has more data to send, and the first geometry engine is buffered in case of interruption. With this structure, the application programmer can, e.g., specify which geometry engine should do particular graphics processing, thereby enabling sophisticated behavioral and physical modeling in real time.

Also, in accordance with this aspect of the invention, the rendering engine remembers the data from each geometry engine and stores these data until deliberately changed. These data, therefore, do not require resetting when the rendering engine begins receiving data from a different geometry engine, thereby enhancing speed.

In yet another aspect, the present invention provides a specialized decompression processor for decompressing high-resolution texture data from a compressed state as stored in main memory. This processor allows for more efficient use of memory.

In a preferred embodiment, the present invention provides a system for packing modeling data into optimal bit widths in data units in main memory. Unpacking logic in the vector processors automatically unpacks these data without sacrificing performance.

In yet another aspect, the present invention provides all processors with a local cache memory. This architecture reduces the amount of data that is required to be transmitted on the relevant buses. In accordance with this aspect of the invention, the cache of the CPU is divided into an instruction cache and a data cache. The data cache first loads a necessary word from a cache line (sub-block ordering) and permits a hazard-free, cache-line hit while a previous load is still in process (hit-under-miss). The output from the cache is also buffered in a write back buffer. This structure allows write requests to be stored until the main bus is free.

A particularly preferred embodiment of the invention provides a scratchpad RAM that works as a double buffer for the CPU. In an application dealing primarily with computer graphics, most of the data written out of the primary processor will be in the form of display lists, which contain the results of geometry calculations in the form of vertex information of primitive objects. These display lists, once generated, will not be needed again by the primary processor because they are a final result to be passed on to the geometry processor. Therefore, there is no benefit derived from caching these data in a traditional data cache when writing out this data (a write access scheme). However, most data read by such a computer graphics application are three-dimensional object data. A whole object must be cached in order to effect the speed of the CPU access to the object. The scratchpad allows a fast way to simultaneously write the display lists and read the object data without going through the standard data cache. Direct memory access ("DMA") transfers between the main memory and the scratchpad allows data transfer without CPU overhead. Treating the scratchpad as a double buffer hides main memory latency from the CPU.

Another aspect of the present invention is the provision of common protocol data jacks for enabling multiple types of inputs and outputs.

These and other aspects of the present invention will become apparent by reference to the following detailed description of the preferred embodiments and the appended claims.

DETAILED DESCRIPTION OF THE PREFERRED EMBODIMENTS

As discussed above, the present invention provides a computer system for providing high resolution computer graphics. The invention is particularly suited for interactive devices operating in real time or with other response time requirements (e.g., simulators and game machines). A preferred embodiment of the present invention, designed for a computer game machine, is described below.

Figure 1:
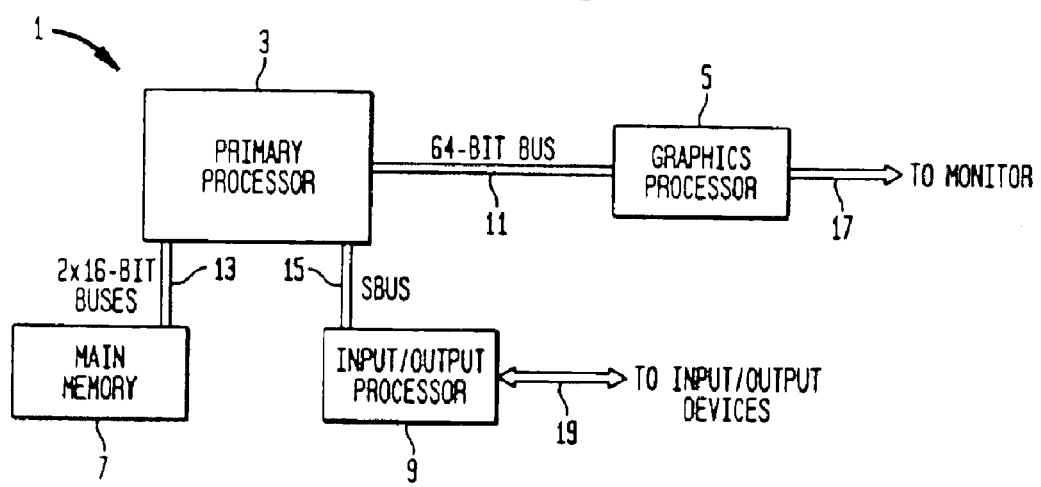
FIG. 1 is a block diagram of the key components of the computer system.

FIG. 1 is a block diagram of computer system 1. Computer system 1 consists primarily of primary processor 3, graphics processor 5, main memory 7 and input/output processor 9.

Primary processor 3 is a single 240 mm$^2$ chip, created using a 0.25-micron photolithography process, with 10.5 million transistors which operates at 300 MHz. Primary processor 3 is connected to graphics processor 5 by a 64-bit bus 11 and to main memory 7 by a pair of 16-bit buses 13. Primary processor 3 is further connected to input/output processor 9 by a 32-bit SBUS 15. Graphics processor 5 is connected to a monitor (not shown) through monitor connection 17. Input/output processor 9 transmits and receives data through input/output device connections 19.

Figure 2:
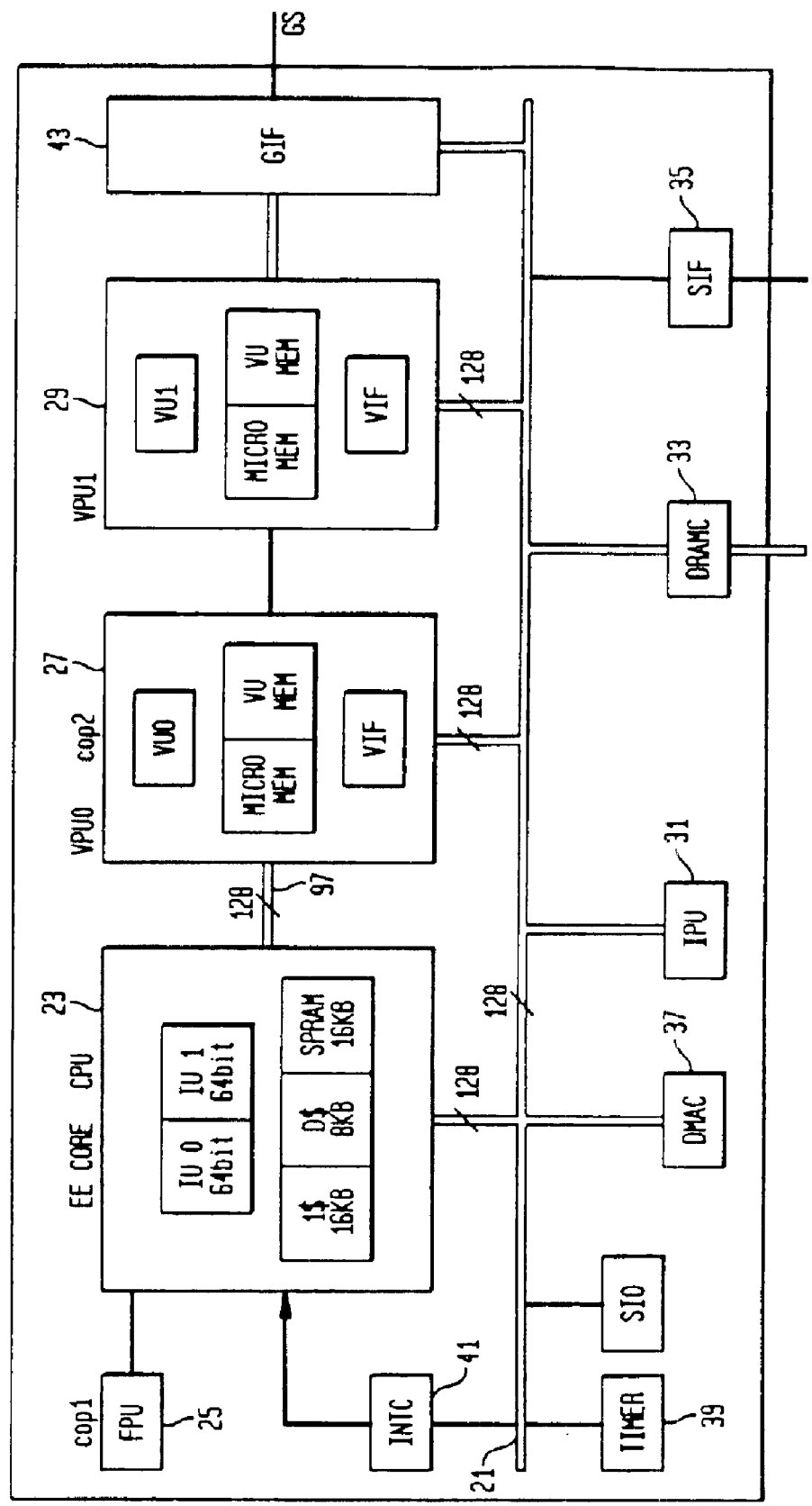
FIG. 2 is a block diagram of the primary processor.

FIG. 2 shows the major components of primary processor 3. Primary processor 3 includes a 128-bit internal primary processor bus 21, primary processor core 23, floating point unit (FPU) 25, a first vector processing unit (VPU0) 27, a second vector processing unit (VPU1) 29, image processing unit (IPU) 31, dynamic random access memory controller (DRAMC) 33, S-bus interface (SIF) 35, direct memory access controller (DMAC) 37, timer 39, interrupt controller (INTC) 41 and graphics processor interface (GIF) 43.

Figure 3:
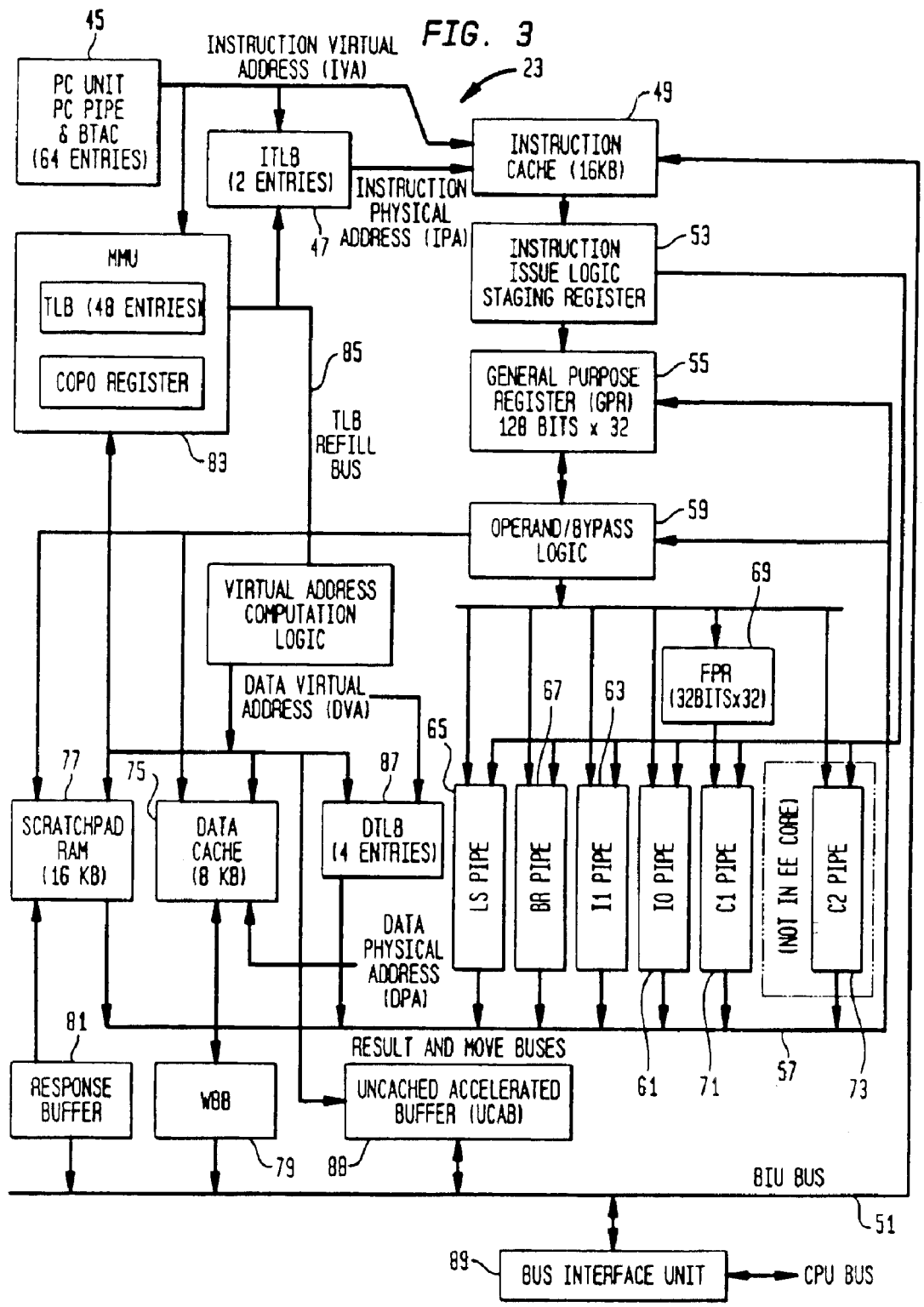
FIG. 3 is a block diagram of the primary processor core.

FIG. 3 shows the primary components of primary processor core 23. Primary processor core 23 is the CPU of computer system 1. Primary processor core 23 has a 2-way superscalar architecture for enabling two instructions to be executed per cycle.

The primary components of the primary processor core include a 32-bit program counter 45. The program counter 45 contains a 64-entry branch target address cache (BTAC) for use in performing branch predictions. Primary processor core 23 predicts whether a conditional branch will be taken and whether to prefetch code from the appropriate location. When a branch instruction is executed, its address and that of the next instruction to be executed (the chosen destination of the branch) are stored in the branch target address cache. This information is used to predict which way the next instruction will branch when it is executed so that instruction prefetch can continue.

The instruction address from program counter 45 is transmitted to the instruction translation look-aside buffer 47. Instruction translation look-aside buffer 47 is a table used in a virtual memory system for listing the physical address page number associated with each virtual address page number. Instruction translation look-aside buffer 47 is used in conjunction with instruction cache 49 whose tags are based on virtual addresses. Instruction cache 49 is an on-chip memory which is much faster than main memory 7 and which sits in between primary processor core 23 and main memory 7. Instruction cache 49 stores recently accessed data to speed up subsequent accesses to the same data. Instruction cache 49 does this exclusively with instructions.

A virtual address is presented simultaneously to the instruction translation look-aside buffer 47 and to instruction cache 49 so that cache access and the virtual-to-physical address translation can proceed in parallel (the translation is done "on the side"). If the requested address is not cached, then the physical address is used to locate the requested data in main memory 7. Instruction cache 49 is a 2-way set associative cache. It receives physical instruction addresses from the instruction translation look-aside buffer 47 and the virtual instruction addresses from the program counter 45. The instruction cache 49 receives cached instructions over BIU bus 51.

Instruction cache 49 also performs an instruction prefetch to minimize the time primary processor core 23 spends waiting for instructions to be fetched from main memory 7. Instructions following the one currently being executed are loaded into a prefetch queue when the external busses are idle. If the primary processor core 23 executes a branch instruction, or receives an interrupt, then the queue must be flushed and reloaded from the new address.

Instruction issue logic and staging register 53 receives the appropriate instructions from the instruction cache 49 as determined by program counter 45, and then determines how to route the instructions to the appropriate one of six pipelines 65, 67, 63, 61, 71 and 73. Instruction issue logic and staging register 53 can pass the instructions to either general purpose registers 55 or the pipelines themselves.

General purpose registers 55 contain 32 128-bit general purpose registers. This large number of registers allows for the handling of many instructions in parallel. These registers are passed information from the result and move buses 57. General Purpose registers 55 can also transmit information to, and receive information from, operand/bypass logic 59. An operand is an argument of the machine language instruction set of primary processor core 23. Operand/bypass logic 59 can also receive information from the result and move busses 57. This scheme allows operand/bypass logic 59 to take operands from the pipelines for immediate use, thus improving performance. If necessary, data can be stored back in the general purpose registers 55. The operand/bypass logic 59 can also send appropriate data to scratchpad RAM 77 and data cache 75. Operand/bypass logic 59 can, of course, also pass appropriate data to the appropriate pipes of the pipelines.

Each of the 6 pipelines, pipelines 65, 67, 63, 61, 71 and 73, is a sequence of functional units ("stages") for performing a task in several steps, like an assembly line in a factory. Each pipeline is passed operands from the operand/bypass logic 59, or the instruction issue logic staging register 53, and passes its results to the result and move bus 57. Each functional unit of a pipeline receives inputs from the previous unit and produces outputs which are stored in an output buffer. One stage's output buffer is the next stage's input buffer. This arrangement allows all the stages to work in parallel thus giving greater throughput than if each input had to pass through the whole pipeline before the next input could enter.

Four of the six pipelines are integer pipelines. The two primary integer pipelines are I0 pipeline 61 and I1 pipeline 63. These pipelines each contain a complete 64-bit ALU (arithmetic logic unit), a shifter, and a multiply accumulate unit. The ALU performs addition, subtraction multiplication of integers, AND, OR, NOT, XOR and other arithmetic and Boolean operations. I1 pipeline 63 contains a LZC (leading zero counting) unit. Pipelines IO 61 and I1 63 also share a single 128-bit multimedia shifter. These two pipes are configured dynamically into a single 128-bit execution pipe per instruction to execute certain 128-bit instructions, such as Multimedia, ALU, Shift and MAC instructions.

LS pipe (load/store pipe) 65 and BR pipe (travel pipe) 67 also are integer pipelines. LS pipe 65 contains logic to support 128-bit load and store instructions which can access main memory 7. BR pipe 67 contains logic to execute a branch instruction.

The remaining pipelines, C1 pipe 71 and C2 pipe 73 support the two coprocessors of system 1, floating point unit (FPU) 25 and vector processing unit (VPUO) 27 (see FIG. 2).

Floating point registers 69 are used to hold and pass data for C1 pipe 71. This pipe contains logic to support the floating point unit 25 as a coprocessor. There are 32 32-bit floating point registers 69 which are given data by the operand/bypass logic 59.

C2 pipe 73 contains logic to support VPU0 27 as a coprocessor.

As noted above, all of the pipelines provide their output to result and move bus 57. Result and move bus 57 passes the data back to operand/bypass logic 59. Operand/bypass logic 59 sends data that are finished with computation to data cache 75 and the scratchpad RAM 77.

Data cache 75 is a 2-way set associative cache which is 8 KB in size. Data cache 75 loads a necessary word from a cache line first (sub-block ordering) and permits a hazard-free cache-line hit while a previous load is still under process (hit-under-miss).

The smallest unit of memory than can be transferred between the main memory and the cache is known as a "cache line" or "cache block". Rather than reading a single word or byte from main memory at a time, a whole line is read and cached at once. This scheme takes advantage of the principle of locality of reference: if one location is read, then nearby locations (particularly following locations) are likely to be read soon afterwards. It also takes advantage of page-mode DRAM which allows faster access to consecutive locations.

The output from data cache 75 is also buffered in write back buffer 79. Data cache 75 has a write back protocol. Under this protocol, cached data is only written to main memory 7 when a later write runs out of memory in the cache and forces out the previous cache. Write back buffer 79 is an 8-entry by 16-byte first-in-first-out (FIFI) buffer ("FIFO"). Its use allows write requests to data cache 75 to be stored until the main internal primary processor bus 21 is free. This scheme increases the performance of primary processor core 23 by decoupling the processor from the latencies of main internal primary processor bus 21.

Scratchpad RAM 77 is 16 KB of static RAM or (sRAM). As discussed above, scratchpad RAM 77 is used as a double buffer to hide latency of main memory 7 from the primary processor core 23. Scratchpad RAM 77 has external DMA read and write capability for further speeding up access to main memory 7. Response buffer 81 buffers scratchpad RAM 77 from primary processor internal bus 21.

Memory management unit 83 supports virtual memory and paging by translating virtual addresses into physical addresses. Memory management unit 83 can operate in a 32-bit and 64-bit data mode. Memory management unit 83 has a 48-double-entry full-set-associative address translation look-aside buffer (TLB). In other words, it has 48 entries of even/odd page pairs for 96 pages total. A page is a group of memory cells in RAM that are accessed as parts of a single operation. That is, all the bits in the group of cells are changed at the same time. The page size for memory management unit 83 can range from 4 KB to 16 MB by multiples of 4. The virtual address size is 32-bits and the physical address size is 32-bits.

Memory management unit 83 sends updates via TLB refill bus 85 to data address translation look-aside buffer (DTLB) 87 and instruction address translation look-aside buffer 47. These data refresh the tables in these functional units.

Instruction address translation look-aside buffer 47 has 2 entries and translation look-aside buffer 87 has 4 entries.

Data translation look-aside buffer 87 translates virtual data addresses to physical data addresses. The physical data addresses are sent to either data cache 75 or result and move bus 57.

Uncached accelerated buffer (UCAB) 88 is also passed from memory management unit 83. Uncached accelerated buffer (UCAB) 88 is a 2 entry by 4 by 16-byte buffer. It caches 128 sequential bytes of old data during an uncached accelerated load miss. If the address hits in the UCAB 88, the loads from the uncached accelerated space get the data from this buffer.

Bus interface unit 89 connects primary processor main internal bus 21 to the BIU bus 51 and thus to primary processor core 23.

An instruction set is the collection of machine language instructions that a particular processor understands. In general, the instruction set that operates a processor characterizes the processor. The instruction set for computer system 1 has 64-bit words that conform to most of the MIPS III (and partially to the MIPS IV) specifications. Specifically, the instruction set implements all the MIPS III instructions with the exception of 64-bit multiply, 64-bit divide, load-linked and store conditional statements. The instruction set for computer system 1 implements the prefetch instructions and conditional move instructions of the MIPS IV specification. The instruction set also includes special primary processor Core instructions for primary processor core 23, such as multiply/add (a 3-operand multiply, multiply-add instruction) and 128-bit multimedia instructions. These instructions allow for the parallel processing of 64-bits×2, or 32-bits×4, or 16-bits×8 or 8-bits×16. The instruction set also includes 11 pipeline operation instructions, an interrupt enable/disable instruction and primary processor core instructions. The instruction set also includes instructions for 3 coprocessors. There is an embedded coprocessor which is used for error checking in primary processor core 23. A second coprocessor, COP1, is FPU 25. This coprocessor is controlled by instructions that are part of the primary processor instruction set. The third coprocessor, COP2, is vector processing unit (VPUO) 27, and is controlled in two ways. In a macro mode, a program can issue macro-instructions to primary processor core 23 to control vector processing unit (VPUO) 27. These macro-instructions are part of the primary processor core instruction set. The vector processing unit (VPUO) 27 also can be controlled directly in a micro mode (see below). The macro mode and the micro mode each has its own instruction set.

As discussed above, primary processor core 23 is the central processor of computer system 1. This processor is supported by a series of additional functional units in primary processor 3. Main internal primary processor bus 21 (FIG. 2) connects primary processor core 23 to these functional units. Main internal primary processor bus 21 has separate data and address buses. The data bus is 128-bits wide. Main internal primary processor bus 21 has 8/16/32/64/128-bit burst access.

However, one functional unit is not connected to the main internal primary processor bus 21. Referring back to FIG. 2, floating point unit 25 is a coprocessor that has both a 32-bit single-precision floating-point multiply-add arithmetic logical unit and a 32 bit single-precision floating-point divide calculator. This unit is tightly coupled to CPU core 23.

Figure 4:
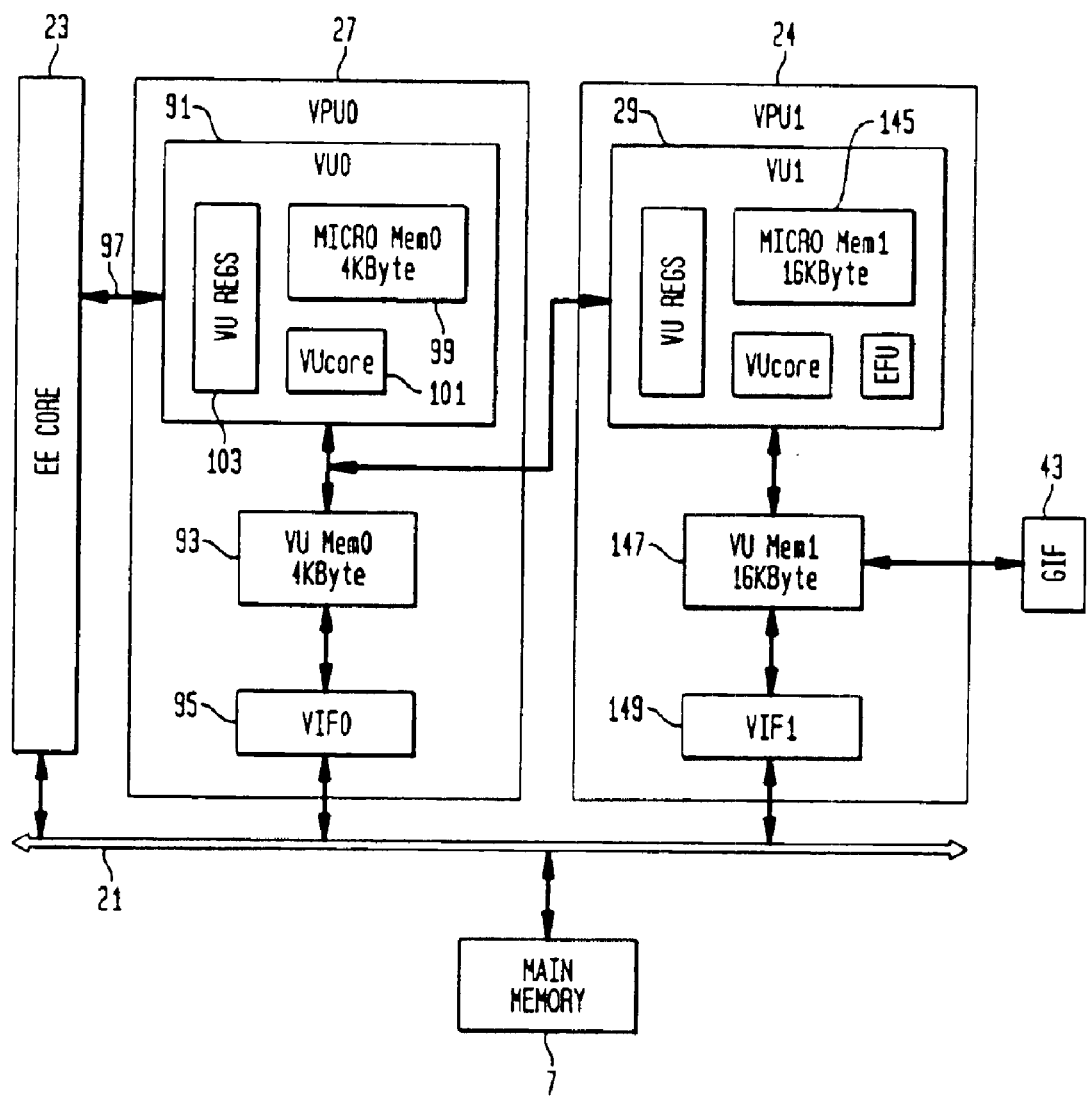
FIG. 4 is a block diagram showing the relationship of the primary processor core to vector processing unit zero and vector processing unit one.

Vector processing unit zero (VPU0) 27 is a coprocessor used for non-stationary geometry processing. This processing includes physical modeling and other complicated matrix computations. Referring to FIG. 4, vector processing unit zero 27 consists of vector unit zero (VU0) 91, vector unit memory zero (VUMem0) 93, and vector interface zero (VIF0) 95. Vector processing unit zero 27 is tightly coupled to primary processor core 23 by VPU0 coprocessor bus 97 which is separate from the main internal primary processor bus 21. Thus the operation resources and registers for vector processing unit zero 27 can be operated directly from primary processor core 23 by using coprocessor macroinstructions. However, vector processing unit zero 27 can also execute microprograms independently of the primary processor core 23.

Vector unit zero 91 is a floating-point vector processor unit. Vector unit zero 91 has a built-in instruction memory, MircoMem0 99. MicroMem0 99 is 4 KB in size. MicroMem0 99 executes programs composed of 64-bit microinstructions from 64-bit long instruction word (LIW) instruction sets. These instructions are used by the vector unit zero core 101 to operate on the data stored in the VU0 registers 103.

Figure 5:
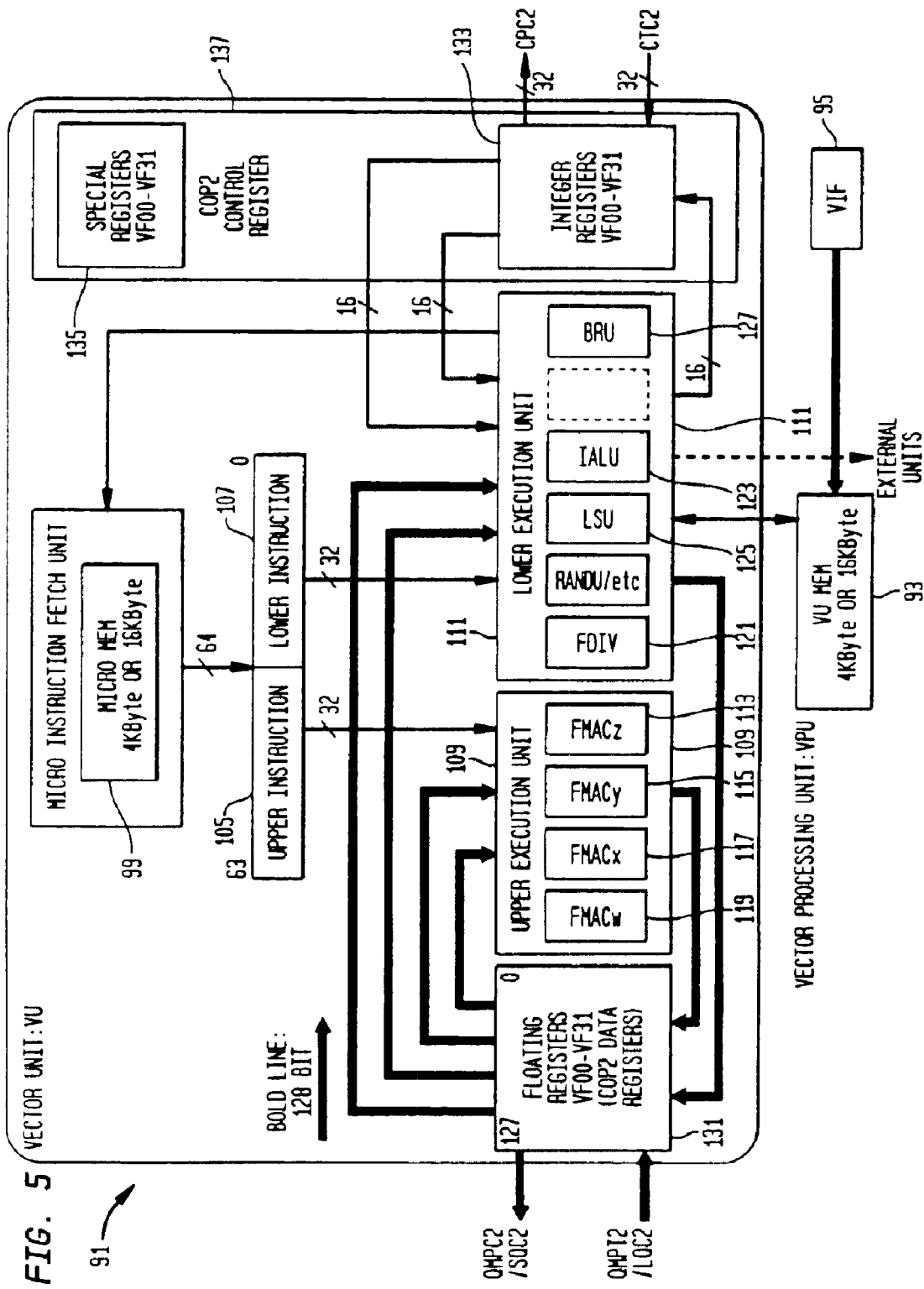
FIG. 5 is a block diagram of vector processing unit zero.

FIG. 5 shows the vector unit zero 91 in more detail. Vector unit zero 91 divides the 64-bit LIWs into an upper instruction field 105 of 32 bits and a lower instruction field 107 of 32 bits. Vector unit zero 91 has pipelines which are logically divided into upper execution unit 109 and lower execution unit 111. Upper execution unit 109 has four 32-bit single-precision floating-point multiply-add arithmetic logical units (FMAC ALUs), called FMACx 113, FMACy 115, FMACZ 117, and FMACw 119. These four FMACs allow simultaneous operation on the coordinates of a vertex of an object being manipulated, whether the coordinates are XYZW, RGBA, STQR, or NxNyNzNw. The lower execution unit 111 has one 32-bit single-precision floating-point division/square root calculation unit (FDIV) 121, as well as a 16-bit integer ALU (IALU) 123, a load/store unit (LSU) 125, a BRU 127 (a unit for controlling program jumping and branching), and a random number generator (RANDU) 129. This division allows each execution unit to be addressed by a 32-bit instruction (the upper and lower instruction fields of the 64-bit LIW). Thus, vector unit zero 91 can simultaneously perform a floating point product-sum calculation and a floating-point division or integer calculation.

Vector unit zero 91 has several different types of vector unit zero 91 registers 103 (FIG. 4). Referring again to FIG. 5, these registers include 32 128-bit floating-point registers 131, which are equivalent to four single precision floating point values each. For a productsum calculation, two 128-bit registers can be specified as source registers and one 128-bit register can be specified as a destination register. These 32 128-bit floating-point registers 131 also act as renamed data registers when 32 128-bit floating-point registers 131 acts as a coprocessor under the direct control of the primary processor core 23.

Vector unit zero 91 also has 16 16-bit integer registers 133. These registers are used for loop counters and load/store calculations. Vector unit zero 91 also has a series of special registers 135. These special registers include the four ACC Registers, which are accumulators for the four FMAC ALUs, the single 32-bit I Register where intermediate values are stored, the Q register where the results of FDIV are stored, and the 23-bit R Register where the random numbers generated by RANDU are stored. Vector unit zero 91 also has a series of control registers 137 which allow primary processor 3 to use vector unit zero 91 as a coprocessor.

Vector processor unit zero 27 also includes vector unit memory zero 93 (FIGS. 4 and 5), which is structured in 128-bit (32-bit×4) units. Vector unit memory zero 93 is 4 KB in size and is connected to the LSU 125 (FIG. 5) by a 128-bit wide bus. By using floating point registers 131 and the vector unit memory zero 93 (built in data memory), vector processor unit zero 27 can execute floating-point vector operations on 4 32-bit words concurrently.

Vector processor unit zero 27 has two modes of operation. In the micro mode, vector processor unit zero 27 operates as an independent processor by implementing micro-instructions stored in MicroMem0 99. This mode allows for highly efficient parallelism. Vector processor unit zero 27 also has a macro mode. In the macro mode, the primary processor core 23 takes control of vector processor unit zero 27 as a coprocessor, and can be controlled by primary processor core 23 coprocessor instructions.

Vector interface zero (VIFO) 95 is a packet expansion engine that implements a data unpacking function. Vector interface zero 95 can efficiently reconstruct DMA-transferred packets of different data lengths for vector unit memory zero 93. Data such as display lists is stored in main memory 7 in formats optimized for fast data transmission and retrieval. These formats are in different data lengths than the actual data would be in its native state. Vector interface zero 95 allows such optimizations to occur without primary processor core 23 having to spend computational power unpacking these data.

Vector interface zero 95 can also start a microprogram. Thus a method for operating vector processor unit zero 27 in micro mode is to send vector interface zero 95 a DMA packet chain direct from scratchpad RAM 77 or main memory 7 with a micro-instruction program, the vector data to be processed, and the instruction to start the micro-instruction program.

Figure 6:
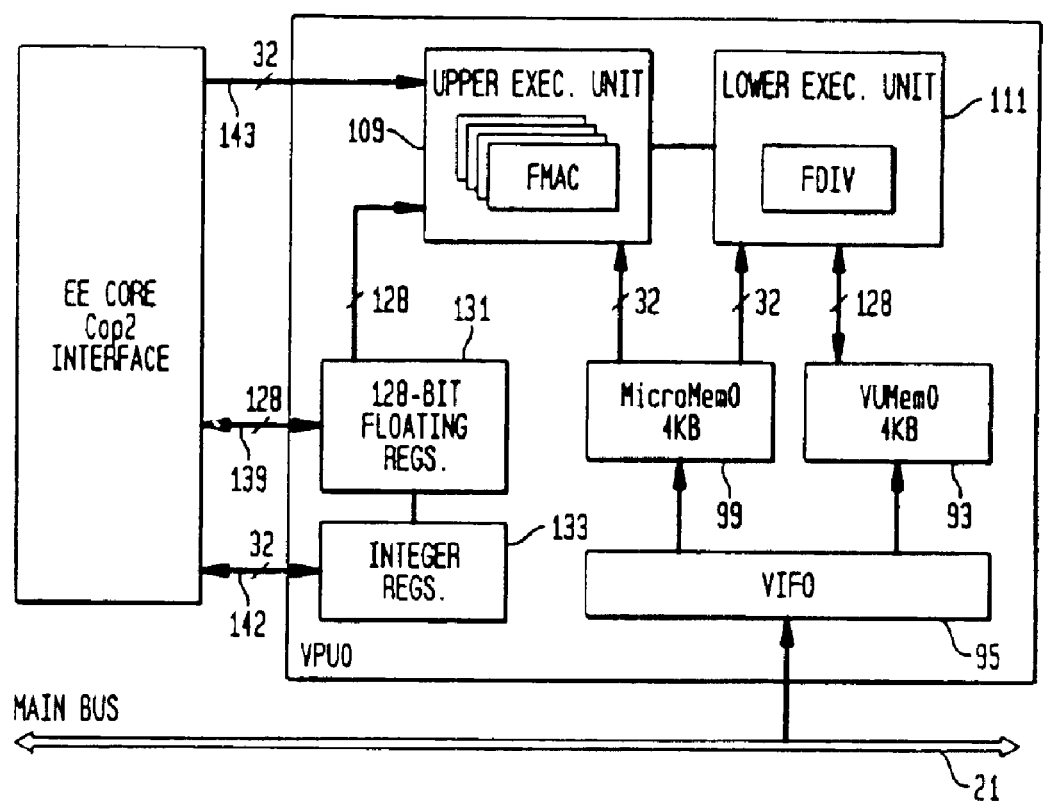
FIG. 6 is a diagram further illustrating the relationship of the primary processor core and vector processing unit zero.

FIG. 6 illustrates in detail the tightly coupled connection between vector processor unit zero 27 and primary processor core 23. Vector processor unit zero 27 coprocessor bus 97 (FIG. 4) is actually 3 separate connections. These connections, shown in FIG. 6, include a 128-bit bus 139 which allows primary processor core 23 to control vector processor unit zero 27 floating point registers 131. These connections also include a 32-bit bus 141 which gives primary processor core 23 control over integer registers 133 of vector processor unit zero 27, and a 32-bit bus 143 which gives the primary processor core 23 control over upper execution unit 109.

Referring again to FIG. 4, vector processing unit one (VPU1) 29 is an independent processor used for stationary geometry processing. These calculations include simple geometry transformations such as translation, rotation, and other calculations such as certain light modeling calculations. Vector processing unit one 29 consists of vector unit one (VU1) 145, vector unit memory one (VM Mem1) 147, and vector interface one (VIF1) 149. Vector processing unit one 29 is connected to the main internal primary processor bus 21.

Figure 7:
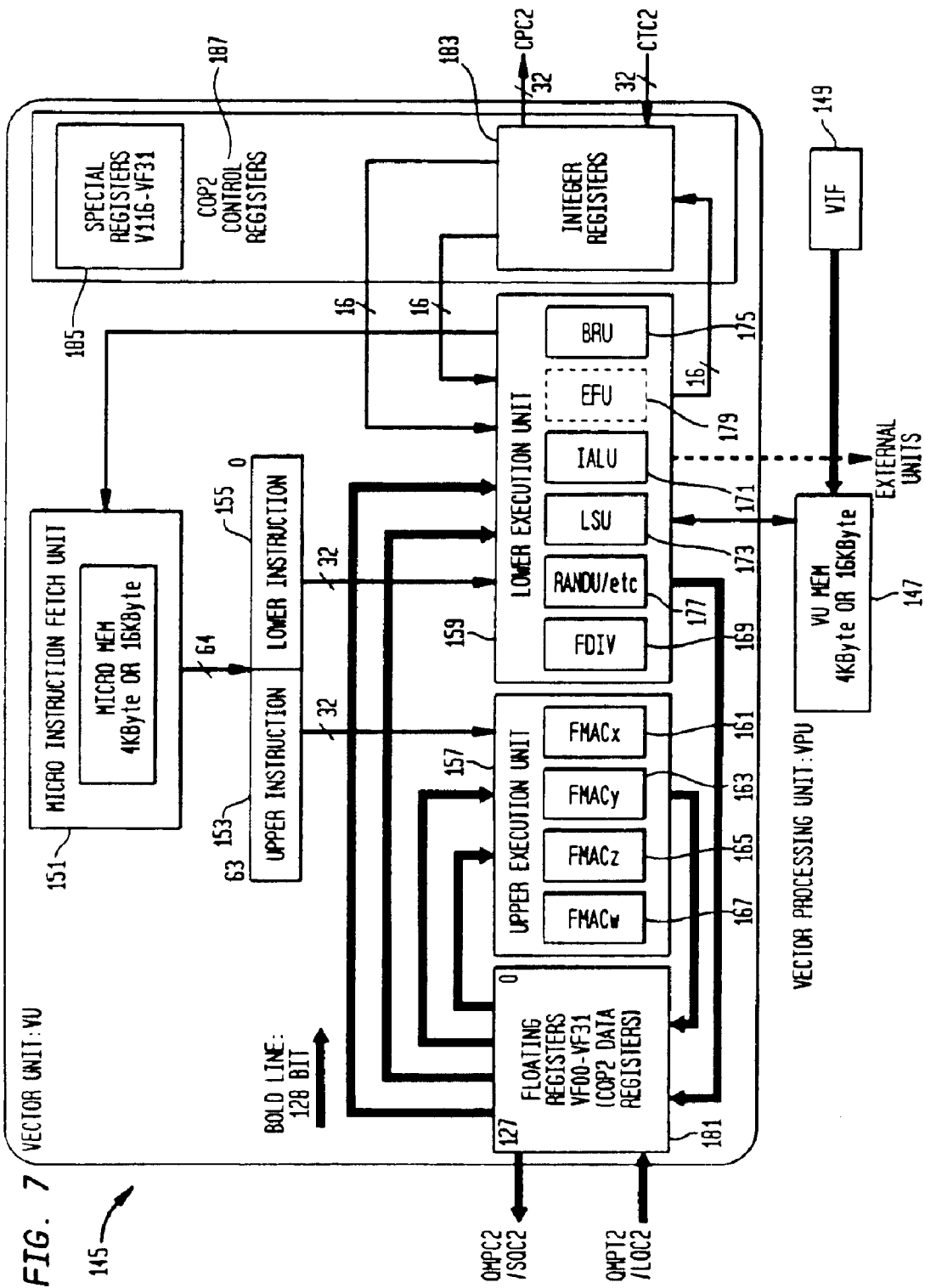
FIG. 7 is a block diagram of vector processing unit one.

Vector unit one 145 is a floating-point vector processor unit. Vector unit one 145 has several elements shown in FIG. 7. MicroMem1 151 is a built-in instruction memory which is 16 KB in size. MicroMem1 151 executes programs composed of 64-bit micro-instructions from 64-bit long instruction word (LIW) instruction sets. The 64-bit LIWs can be divided into an upper instruction field 153 of 32 bits and a lower instruction field 155 of 32 bits.

The pipelines of vector unit one 145 are logically divided into upper execution unit 157 and lower execution unit 159. The upper execution unit 157 has four (4) 32-bit single-precision floating-point multiply-add arithmetic logical units (FMAC ALUs), called FMACx 161, FMACy 163, FMACZ 165, and FMACw 167. Lower execution unit 159 has one 32-bit single-precision floating-point division/square root calculation unit (FDIV) 169, as well as a 16-bit integer ALU (IALU) 171, a Load/Store Unit (LSU) 173, a BRU (a unit for controlling program jumping and branching) 175, and a random number generator (RANDU) 177. Lower execution unit 159 also has an elementary function unit (EFU) 179. Elementary function unit 179 performs exponential, logarithmic and trigonometric functions. Elementary function unit 179 also performs calculations on scalar or vector values and outputs a scalar value. This division of pipelines between upper execution unit 157 and lower execution unit 159 allows each execution unit to be addressed by a 32-bit instruction (the upper and lower instruction fields of the 64-bit LIW). Thus vector unit one 145 can simultaneously perform a floating point product-sum calculation and a floating-point division or integer calculation.

Vector unit one 145 also contains 32 128-bit floating-point registers 181. Each of these registers can contain four single precision floating point values. For a product-sum calculation, two 128-bit registers can be specified as source registers and one 128-bit register can be specified as a destination register. Vector Unit One 145 also contains 16 16-bit integer registers 183. These registers are used for loop counters and load/store calculations. Vector unit one 145 also has a series of special registers 185. These special registers 185 include four ACC Registers, which are accumulators for four FMAC ALUs, a single 32-bit I Register where intermediate values are stored, a Q register where the results of FDIV are stored, a 23-bit R Register where the random numbers generated by RANDU are stored, and a P register which records the value generated by EFU 179. Vector unit one 145 also contains control registers 187.

Vector unit one 145 also contains vector unit memory one 147, a date memory which is structured into 128-bit (32-bit×4) units. Vector unit memory one 147 is 16 KB in size and is connected to load/store unit 173 by a 128-bit wide bus. By using floating point registers 181 and vector unit memory one 147, the vector unit one 145 can execute floating-point vector operations on 4 32-bit elements concurrently.

Vector processing unit one 29 (FIG. 4) has only the micro mode of operation. In the micro mode, the vector unit one 145 operates as an independent processor by implementing micro-instructions stored in MicroMem1 151. This mode allows for highly efficient parallelism as it requires minimal intervention by primary processor core 5.

Vector processing unit one 29 also contains a packet expansion engine, vector interface one (VIF1) 149, for implementing a data unpacking function. Vector interface one 149 can efficiently reconstruct DMA-transferred packets of different data length. Data such as display lists are stored in main memory 7 in formats optimized for fast data transmission and retrieval. These formats are in data lengths different from the lengths of the actual data in its original state. Vector interface one 149 allows such optimizations to occur without primary processor core 23 having to spend computational power unpacking these data. Referring back to FIG. 2, other specialized functional units are included in primary processor 3. Graphics processor interface 43 is one such specialized functional unit. Graphics processor interface 43 acts as the interface between primary processor 3 and graphics processor 5 (FIG. 1). Graphics processor interface 43 is essentially an arbitration unit that can decide whether to allow data from primary processor core 23 and vector processor unit zero 27, as opposed to the vector processor unit one 29, to pass through to graphics processor 5 as these units generate parallel data streams.

Figure 8:
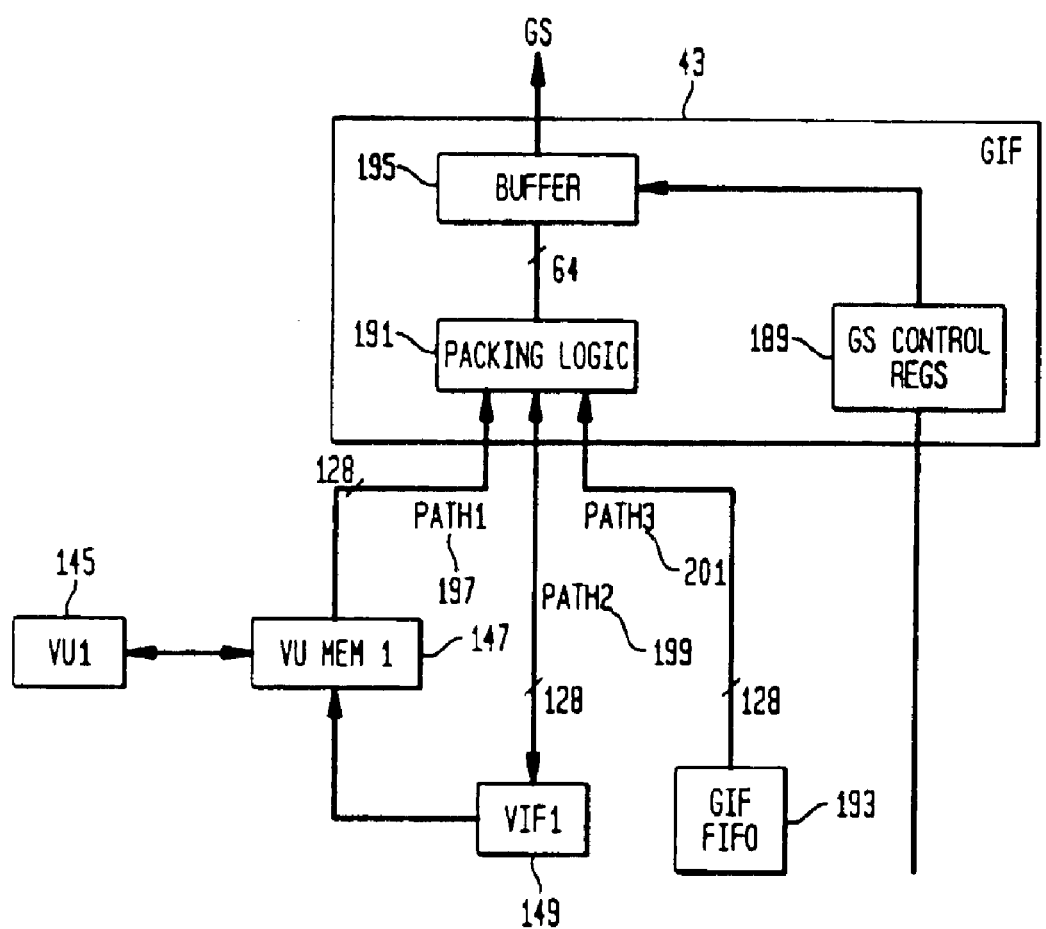
FIG. 8 is a block diagram of the graphics processor interface ("GIF") showing its possible data paths.

Referring to FIG. 8, graphics processor interface 43 contains control logic and control registers 189, packing logic 191, and a 256-byte embedded FIFO register 193 (first-in, first-out) that caches the inputted data. There is a second buffer 195 to hold the output of the graphics processor interface 43 before sending these data to graphics processor 5.

Graphics processor interface 43 allows three possible paths for data to the graphics processor 5. The first path is PATH1 197, which transfers data from vector unit memory one 147 to graphics processor 5. PATH2 199 is the data transfer path from vector interface one (VIF1) 149. PATH3 201 is the direct data transfer path from the main internal primary processor bus 21 to graphics processor interface 43, running through the embedded FIFO register 193. PATH3 201 is used when transferring data from main memory 7 or scratchpad memory 77 to graphics processor 5. Graphics processor interface 43 arbitrates between transfer requests for the different paths, favoring PATH1 197 over either PATH2 199 or PATH3 201.

Graphics processor 5 is passed data in a format consisting on two or more graphics processor primitives, each headed by a GIFtag. The GIFtag is 128-bit in length, and denotes the size of the following GRAPHICS PROCESSOR primitive and its data format (or mode). The GIFtag can designate the register in graphics processor 5 to which the data should be passed, thus specifying the data. Graphics processor interface 43 is also passed one of three modes for graphics processor interface 43 to operate in: PACK, REGLIST, and IMAGE. The first mode designates the need to eliminate extraneous data from the primitive by using the GIF's packing logic 171, allowing graphics processor interface 43 to output a display list. The second mode designates that the graphics processor primitives being passed are already in display list format. The third mode is used for transferring image data such as texture data to graphics processor 5.

Figure 9:
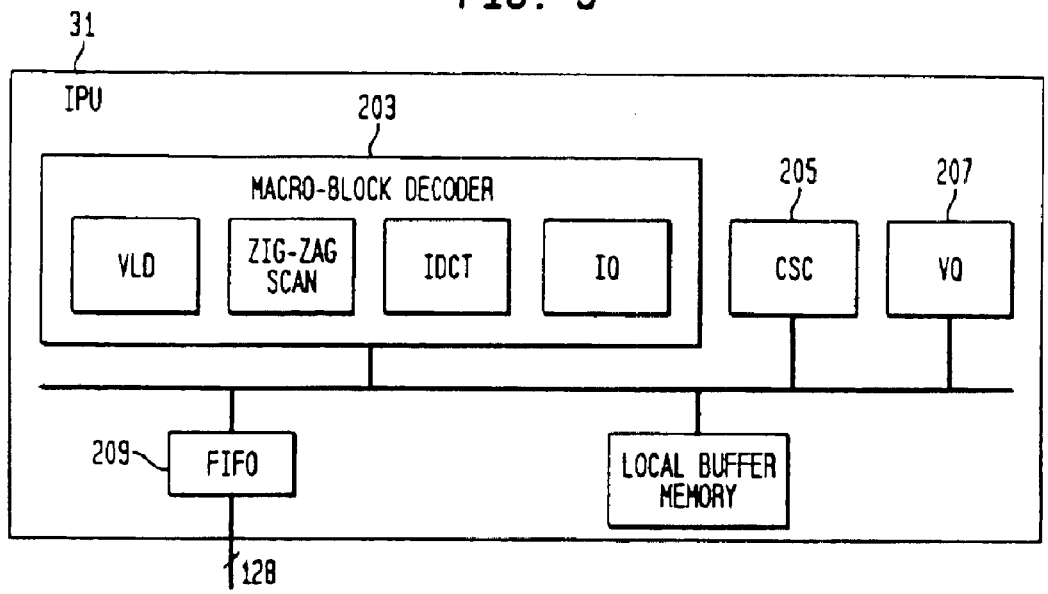
FIG. 9 is a block diagram of the image processing unit ("IPU").

A detailed description of image processing unit (IPU) 31 is shown in FIG. 9. Image processing unit 31 is an image data decompression processor primarily involved with the interpreting and decoding of an MPEG2 bit stream. This operation generally is used to generate MPEG encoded texture data for the rendering engine. Image processing unit 31 also includes macro block decoder 203 for performing macro block decoding. This processing is used to generate data upon which primary processor core 23 performs motion compensation. IPU 31 does not perform motion compensation.

Image processing unit 31 also contains units for performing a set of post processing functions. These units include color space conversion 205 and dither and vector quantization 207. Color space conversion 205 converts the YCrCb data of the MPEG2 data stream into RGBA format. YCrCb is a chrominance/luminance color space model used in the British PAL television standard. Y specifies luminance, Cr and Cb specify chrominance (blue/yellow and red/cyan (or blue-green) components). Dither is used to smoothly convert 32-bit RGB format data to a 16-bit RGB format data. Vector quantization 207 uses the Color Look-Up Table (CLUT) to convert 16-bit RGB data to a 4-bit or 16-bit index number used in color calculations such as texture mapping. The Color Look Up Table (CLUT) is a table which establishes a correspondence between the global palette (64K colors, for example), and the subset of colors, i.e. the limited palette (made of 16 or 256 colors), used by a particular texture.

Image processing unit 31 also contains two 128-bit FIFO registers 209 for input and output, two 64-bit registers, and two 32-bit registers.

Figure 10:
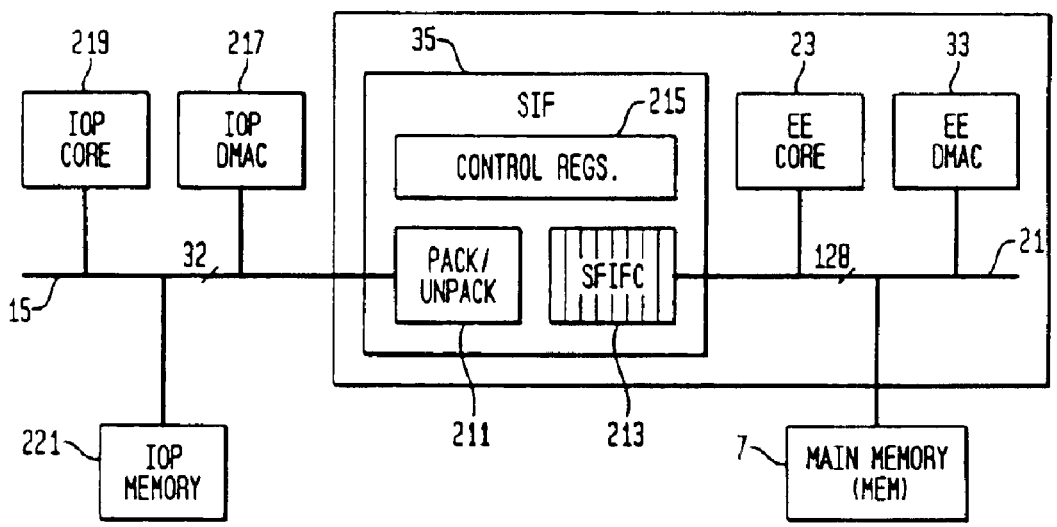
FIG. 10 is a block diagram of the S bus interface ("SIF").

FIG. 10 shows a detailed description of S-bus interface (SIF) 35. S-bus interface 35 is the interface unit to input output processor 9 (FIG. 1). S-bus interface 35 is connected to input output processor 9 by a 32-bit bus, S-bus 15. S-bus 15 is a 32-bit bus for backward-compatibility reasons because input output processor 9 is a 32-bit processor. S-bus interface 35 carries out the necessary conversion of 128-bit data to 32-bit data with packing/unpacking logic 211, storing the data to be packed and unpacked in SFIFO register 213. S-bus interface 35 also contains control registers 215.

Another specialized functional unit shown in FIG. 10 is direct memory access controller (DMAC) 33 which has 10 channels for direct memory transfers. Direct memory access allows memory transfers to occur without the mediation of the primary processor core 23, thus saving processing time. Memory transfer channels exist between main memory 7 and scratchpad RAM 77. Memory transfer channels also exist between main memory 7 and/or scratchpad RAM 77 and vector interface zero 95, vector interface one 149, graphic processor interface 25, image processing unit 31, and the S-bus interface 35. The DMA channels dealing with S-bus interface 35 transfer memory to S-bus 15 in cooperation with the corresponding IOP DMAC 217. Again, IOP DMAC 217 allows input/output processor core 219 to not be involved in a memory transfer, such as to input/output processor memory 221.

Another specialized functional unit is the dynamic random access memory controller (DRAMC) 37 (FIG. 2) which controls the access to main memory 7. In this embodiment, dynamic random access memory controller 37 controls Rambus direct random access memory, which is used in the 32 MB of main memory 7. Rambus direct random access memory is a specialized type of RAM allowing for very quick access. This special memory technology allows very high bandwidth of data transfer at up to 600 MHz with low latency. The fastest current memory technologies used by PCs (SDRAM), on the other hand, can deliver data at a maximum speed of only about 100 MHz.

Another specialized functional unit is interrupt controller (INTC) 41 (FIG. 2). Interrupt controller 41 signals device interrupts from each device to primary processor core 23, and from DMAC 37.

Another specialized functional unit is timer 39 (FIG. 2). Timer 39 contains four separate timers.

In operation, primary processor 3 takes advantage of the inherent parallelism and differentiation of the functional units in its design. One operation performed is patterned processing. Such processing involves images that can be generated by control point and matrix operations. These operations include perspective conversion, parallel light source calculation, creation of secondary curved surfaces, and similar such calculations. In non-patterned processing, on the other hand, images are generated by complex polygon operations. Such operations include the simulation of deductive reasoning or physical phenomena. Patterned processing generally is performed by vector processing unit one 29, while non-patterned processing generally is performed by primary core 23 in combination with vector processing unit zero 27.

There are several methods of taking advantage of this architecture. An example is a race-car game. In such a game, it is advantageous to calculate the position of the car's axles based upon physical modeling of the situation (speed of the car, angle of the car, surface and angle of the road, etc.). Primary processor core 23 with vector processing unit zero 27 are responsible for calculating the position of these axles. However, once these calculations are made, the position of the tires and the body of the car are determined. The object data, which would include the dimensions of the tire, car body, etc, then would be calculated based upon the control points generated by calculating the position of the axles. Thus, the actual position of these objects would be determined. Vector processor unit one 29 would be used to carryout these relatively simpler calculations. Vector processor unit one 29 is much more efficient at carrying out these simpler calculations. This division of responsibility frees Primary processor core 23 to perform other operations. Vector processor unit one 29 would then pass the display list generated to the graphics processor 5 to be rendered. The display list is a data format which defines one of seven primitives graphics processor 5 can draw, the conditions under which each primitive is to be drawn, and the vertices of the primitives.

A second example of the advantages of the architecture of computer system 1 is to display as a scene in a game, for example, a water drop falling against a background of skyscrapers. The calculations involving the water drop would be physically modeled. The Primary processor core 23 would perform these calculations. The Primary processor core 23, with vector processing unit zero 27, then would generate a display list which would be passed to graphics processor 5 to be rendered. Simultaneously, vector processor unit one 29 would take object data of the skyscrapers from main memory 7 and generate their position in the background using simple matrix calculations. Primary processor core 23, with vector processing unit zero 27, would also generate the matrices used to manipulate this object data. Thus, each processor works separately on the calculations for which it is suited to achieve parallelism.

Figure 11:
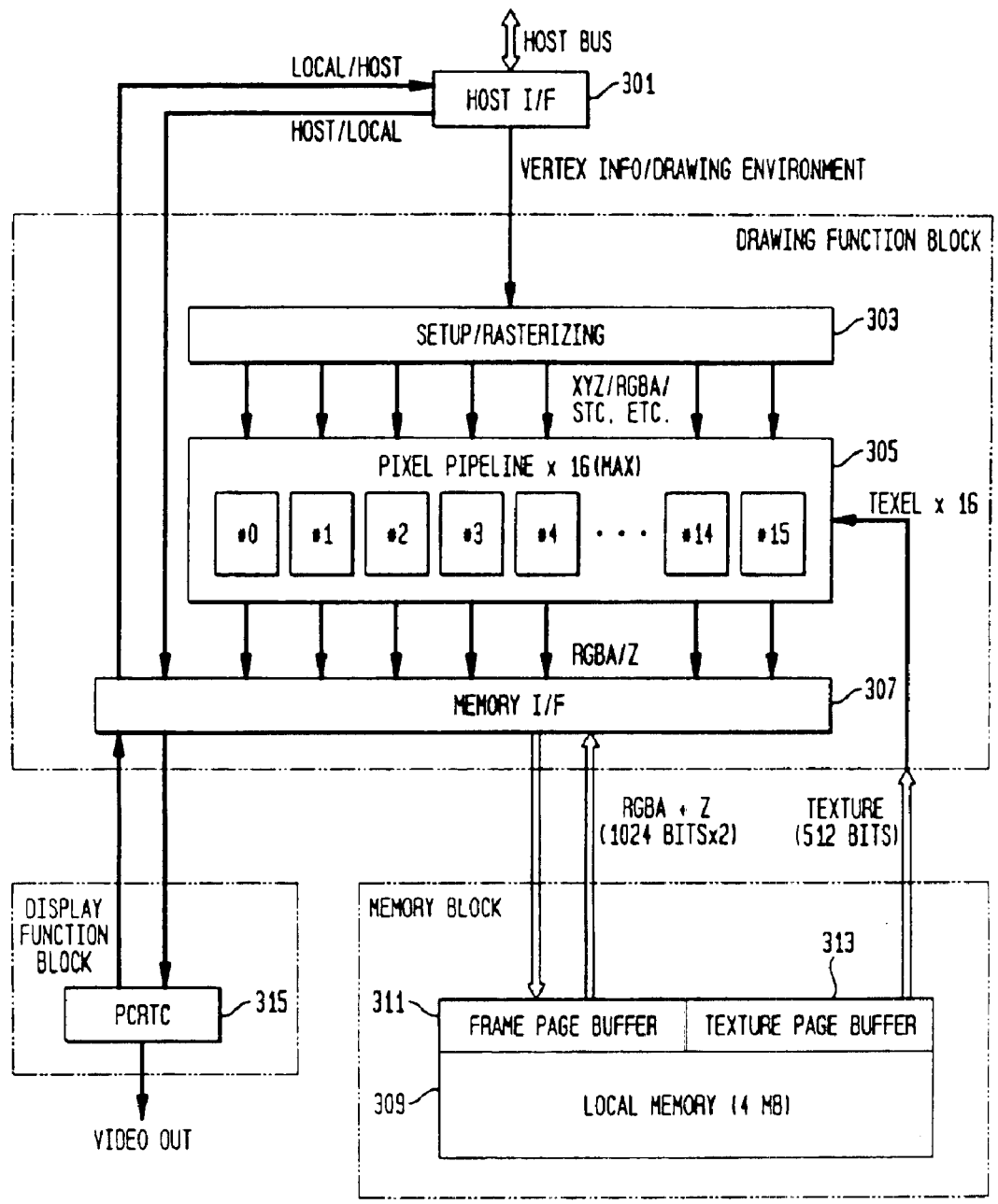
FIG. 11 is a block diagram of the graphics processor.

Graphics processor 5 is a high performance rendering engine. The primary function of graphics processor 5 is to take display lists which define primitives, such as line or triangles (polygons), from the primary processor 3 and render these primitives in the frame buffer. Graphics processor 5 has logic to perform a variety of specialized calculations useful in rendering the primitives. Graphics processor 5 can be described in functional units, as shown in FIG. 11.

The first functional unit is the Host I/F 301. HOST I/F 301 is an interface between the main bus and primary processor 3.

Setup/Rasterizing Preprocessor 303 is a functional unit that takes the display list data of primitives and their vertices and gives out the value for each pixel of such variables as RGBA, Z value, texture value, and fog value. The rasterization uses a digital differential analyzer (DDA) algorithm, an algorithm commonly used for line drawing.

The "A" in RGBA is the alpha channel. The alpha channel is the portion of each pixel's data that is reserved for (usually) transparency information. The alpha channel is really a mask which specifies how the pixel's colors should be merged with another pixel when the two are overlaid, one on top of the other.

The pixel pipelines 305 processes a maximum of 16 pixels in parallel. The pixel pipelines operate on 32-bit words. The pipeline performs such processes as texture mapping, fogging, and alpha-blending and determining the final drawing color based on pixel information such as the alpha channel and the coverage.

Memory I/F 307 reads and writes data from local memory 309. Local memory 309 is 4 MB of RAM memory on graphic processor 5. Local memory 309 contains the frame buffer, Z-buffer, texture buffer and CLUT. Local memory 309 has a 1024-bit read port and a 1024 bit write port for writing to and reading from the frame buffer, and a 512-bit port for texture reading. The first two ports are associated with frame page buffer 311, and the last port with texture page buffer 313. Frame page buffer 311 can, for example, simultaneously send and receive sixteen (16) 64-bit pixel descriptions from Memory I/F 307, the 64-bit pixel descriptions including a 32-bit RGBA variable and a 32-bit Z variable. The texture page buffer can pass sixteen (16) 32-bit texels a cycle to the pixel pipeline 305.

The frame buffer is an area where image data of drawing results are stored. The frame buffer can store pixels in RGBA32 (8 bits/8 bits/8 bits/8 bits) RGB24 (8 bits/8 bits/8 bits), and RGBA16 (5 bits/5 bits/5 bits/1 bit) formats. These formats are all stored in 32-bit words. The pixels can be designated in two kinds of coordinate systems. The primitive coordinate system, which is the coordinate system of the drawing space, designates the vertex coordinate value during the drawing phase. The rectangular area in the frame buffer where drawing actually takes place is defined in this space. The window coordinate system is the system of coordinates which takes the upper left hand corner of the frame buffer as its origin. The calculation of memory addresses is based on these coordinates. The two coordinate systems are intraconvertible by an offset value for x and y.

The Z coordinate is stored in the Z-buffer in 32, 24, and 16 bit formats.

In addition to the data formats defined for the frame buffer, the IDTEX8 and IDTEX4 formats are used in the texture buffer. These data formats represent vectors pointing to a color in a color lookup table (CLUT). The CLUT is used to convert a texel value from an index to RGBA color data. The CLUT is stored in the CLUT buffer.

The PCRTC (Cathode Ray Tube Control) 315 displays the contents of the frame memory in the specified output format. Such formats include VESA standard, NTSC, and PAL. The VESA standards are for computer monitors, and include the SVGA (Super VGA) standard. The NTSC standard for television, used primarily in the United States, defines a composite video signal with a refresh rate of 60 half-frames (interlaced) per second. Each frame contains 525 lines and can contain 16 million different colors. PAL is the television standard used in Europe.

In operation, graphics processor 5 receives a display list comprising seven types of primitives, including a point, a line, a line strip, a triangle, a triangle strip, a triangle fan and a sprite. The strips and fan are more efficient to draw as they utilize shard vertices. The sprite is an independent triangle defined by two diagonally opposite corner vertices. A sprite is often used to write text (e.g., a billboard in the background of a race game). The primitives in the display list will also give the drawing attributes of the primitive. These drawing attributes include shading method, texture mapping, fogging, alpha-blending, anti-aliasing, texture coordinates, and context. Context informs graphics processor 5 whether a primitive was generated by primary processor core 23 in combination with vector processor unit zero 27 or by vector processor unit one 29. Context, therefore, allows all of the other drawing attributes to be set to one of two defaults previously set, thus saving graphics processor 5 processing time. This feature expedites switching between the two sources, and thus promotes efficient parallel processing of geometry data. All of these drawing attributes are set in drawing environment registers 317 (FIG. 12).

Graphics processor 5 will then read the vertex information following the primitive definition and drawing attributes, and begin the drawing process. The vertex information can be up to a set of four 32-bit coordinates. These coordinates can include, for example, the XYZW homogeneous coordinate of each vertex, the RGBA color data of each vertex and texture coordinates STQR (homogeneous coordinates). Other data potentially passed includes the vector normals of a vertex of a polygon, Nx, Ny, Nz, Nw (used in calculations such as light reflection). These vector normals are expressed in homogeneous coordinates.

Homogeneous coordinates are coordinates under which the transformation of scaling, rotation and translation can all be accomplished by matrix multiplication without vector addition. This representation has clear advantages because of its ease of manipulation. A point represented in homogeneous coordinates is expressed with an additional coordinate to the point. So, a two-dimensional point is represented in homogeneous coordinates by three coordinates.

Figure 12:
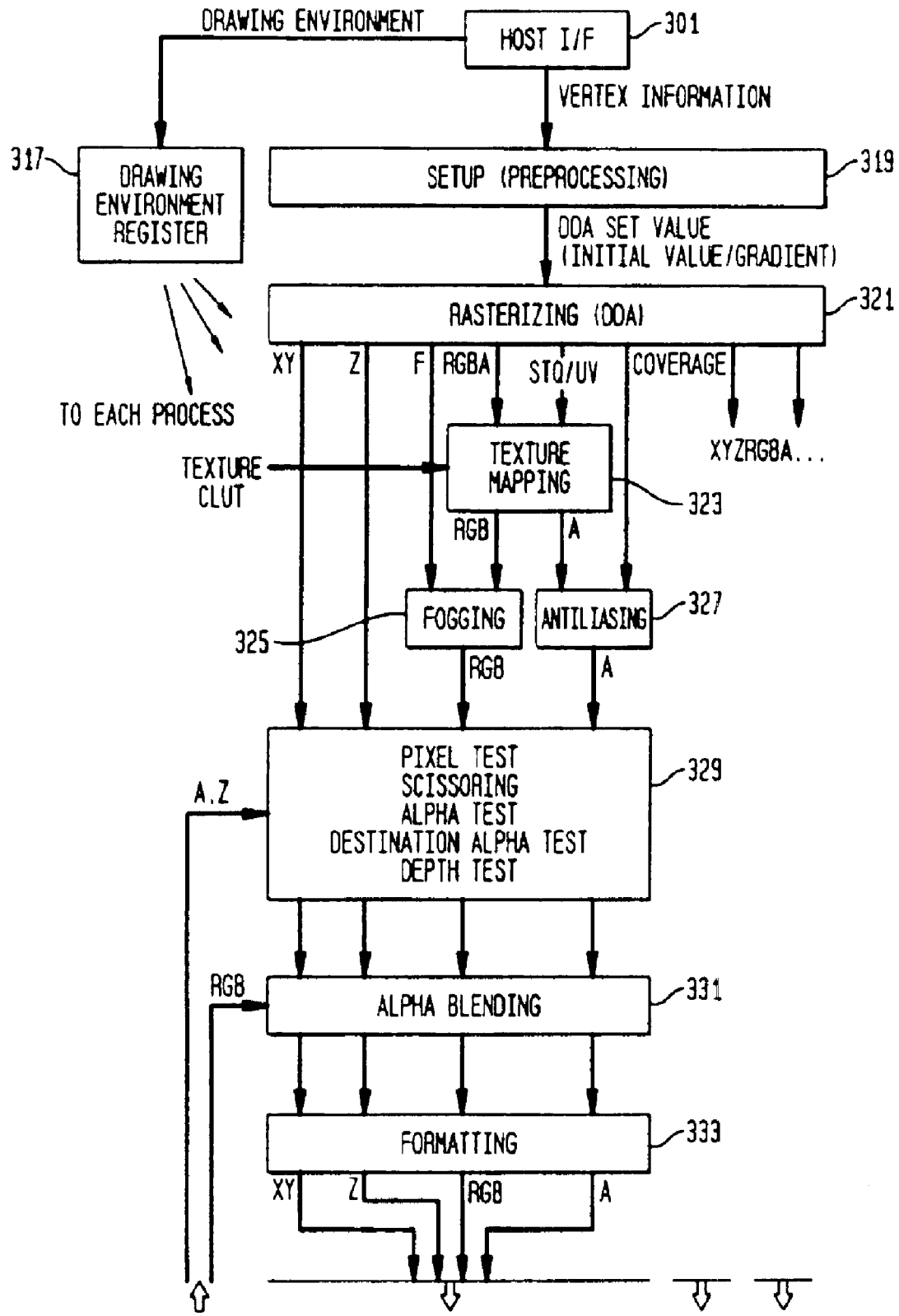
FIG. 12 is a block diagram of the process of rendering pixels in the graphics processor.

FIG. 12 diagrams the processes applied to pixel data in graphics processor 5 during setup (preprocessing) 319, the gradient (amount of change) of the values of the variables received for the vertices of the primitives are calculated. Values of the needed variables then are calculated along the drawn lines outlining the primitives. Rasterizing 321 then takes place. This logic implements a DDA (Digital Differential Analyzer) which fills in the pixels inside the primitive. The number of pixels written per cycle varies. With texture mapping deactivated, 16 pixels are generated concurrently. When texture mapping is activated, 8 pixels are generated concurrently. For example, associated with a pixel could be X, Y, Z values, R, G, B, A values, texture coordinates and a fog value. All these values could pass into pixel pipelines 305 (FIG. 11) simultaneously.

In pixel pipelines 305, there are a series of optional graphic effects applied to each pixel. These effects, shown in FIG. 12, include texture mapping 323, anti-aliasing 325, fogging 327, pixel testing 329 and alpha-blending 331.

Graphics processor 5 fills pixels in the following manner. In the case of a triangle primitive, graphics processor 5 institutes a novel feature called a "moving stamp." In the prior art, an arbitrary triangle was filled using a rectangular stamp of a certain number of pixels by a certain number of pixels. This stamp improved efficiency in calculating the values for the pixels to be filled in the triangle by calculating the needed values for the first pixel (in the corner of the stamp). For each pixel thereafter calculated within the stamp, the calculations can be made in reference to the first pixel. Obviously part of these calculations involves whether the pixel should be written to the frame buffer at all (it should not if the pixel lies within the stamp but outside the triangle).

This algorithmic approach, as implemented in the prior art, has certain drawbacks. The stamp is fixed in reference to an axis, such as the y-axis. Thus, the stamp propagates along the x-axes of the triangle, until all of the triangle of that y-region had been filled, and then the stamp would increment up the y-axis by the height of the rectangle. The stamp would then start moving again in the x-direction at the exact same x-coordinate. If the left triangle side was at all sloped, therefore, many calculations were wasted by checking to see if pixels should be written into a part of the stamp well outside the triangle.

The "moving stamp" by contrast is able, within certain increments, to shift the x-coordinate of its starting point when incrementing up the y-axis. This shifting is a more efficient method for filling pixels within the triangle. For any given stamp over the edge of the triangle, the stamp is likely to have less area outside the triangle.

Figure 13:
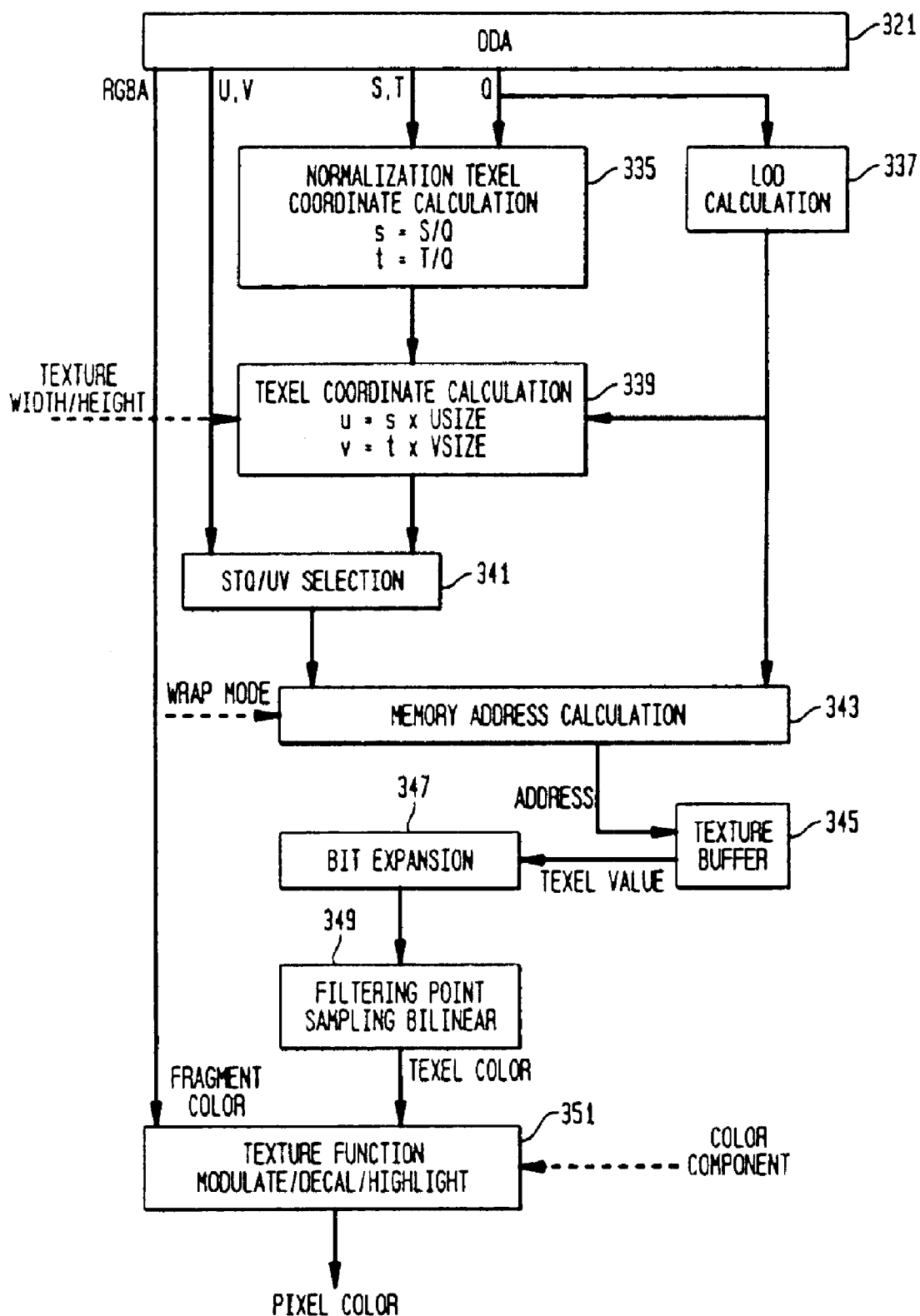
FIG. 13 is a block diagram of the process of texture mapping in the graphics processor.

Texture mapping 323 is performed on the pixels in the pipeline, if this option has been activated. Texture mapping is in essence the "painting" of a bitmap texture onto a polygon. Texture mapping 323 for graphics processor 5 is shown in greater detail in FIG. 13. The color of a given pixel written to the frame buffer is determined by a combination of a texel color and the pixel color derived from the rasterization process. The texel color is determined from either the S,T,Q or U,V. These coordinates both refer to a texture map, a bitmapped image which contains texels (texture pixels) that are to be painted onto the polygon.

The S,T,Q coordinates are the texture coordinate system, a homogeneous system. The normalized coordinates s,t are derived from s=S/Q, and t=T/Q 335. These coordinates are useful for applying texture mapping with perspective correction. Perspective correction removes the distortion that appears when a texture map is applied to a polygon in space. Perspective correction takes into account the depth of a scene and the spatial orientation of a polygon while rendering texels onto the surface of a polygon. The S,T,Q coordinates also assists in performing MIPMAP calculations to determine the correct LOD (Level of Detail). MIP mapping is a technique of precomputing antialiased texture bitmaps at different scales (levels of detail), where each image in the map is one quarter of the size of the previous one. When the texture is viewed from different distances, the correct scale texture is selected by the renderer so that fewer rendering artifacts are experienced, such as Moire patterns.

The U,V coordinate system is the texel coordinate system. The texture coordinate system is converted at block 339 into the texel coordinate system after the above calculations have been run. The texture map can be up to 1024 by 1024 texels. The LOD calculation 337 involves choosing the right level of detail of the MIPMAP to be used.

After the selection of a S,T,Q derived U,V versus an original U,V value 341, the memory address calculation 343 is made. This is complicated by attempts to address a texel outside the texture map. This problem can be addressed by wrapping or repeating the texture, or clamping the texture such that the texels on the edge are stretched out to the size needed to be addressable by the address calculated.

This calculated address is then sent to the texture buffer 345, and a texel value is sent to the Bit Expansion engine 347. If the texel value is not in a format with 8 bits for each variable of RGBA (RGBA32 format), the format is converted. Either RGBA16 or RGBA24 under goes a bit expansion, or a IDTEX8 or IDTEX4 format is referenced to the appropriate CLUT and converted to an RGBA32 format.

The texel value is then sent on to filtering 349. Filtering options include point sampling, and bilinear interpolation in the MIPMAP itself. Bilinear interpolation is an algorithm for interpolating image data in order to estimate the intensity or color of the image in between pixel centers. The interpolated value is calculated as a weighted sum of the neighboring pixel values.

There are seven possible MIPMAPs (seven levels of detail) derivable from the primary texture map created by the game developer. Given certain settings, it is possible to select linear interpolation between two adjacent MIPMAPs after each have undergone bilinear interpolation in order to avoid jumps between MIPMAPs in a game where the point of observation is advancing. This is trilinear filtering.

A final value, a texel color, must be blended with the RGBA value of the pixel (called a color fragment) by a function 351. Several functions are possible, depending on the effect one wishes to generate. These functions are MODULATE (the final value is the multiplication of the fragment value with the texel value for each color), DECAL (the final value is the textel value), HIGHLIGHT (the final color values are determined by Vv=Vf*Vt+Af, and where Av=At+Af), and HIGHLIGHT2 (the color values are calculated as in highlight, but the final alpha value is the fragment alpha value). By multiplication what is meant is A*B=(A×B)>>7, and the result is clamped between 0 and 0×ff.

After texture is applied, a fogging effect may be applied at block 325 (FIG. 12). This effect blends the set fog value (often gray) with the RGBA value produced above. Fogging works such that the farther objects become increasingly obscured. In other words, the contrast between the fog color and objects in the image gets lower the deeper an object appears in the scene. Fogging may be used to provide a back-clipping plane where objects too distant to be seen clearly are removed to speed up the rendering of a scene.

An anti-aliasing effect may be applied at block 327. Anti-aliasing is a method of reducing or preventing aliasing artifacts when rendering by using color information to simulate higher screen resolutions. In the graphics processor 5, anti-aliasing is performed by taking the coverage value (ratio of area which covers the pixel) produced by the DDA for each pixel on the edge of a primitive, treating it as alpha, and performing alpha blending between the original primitive color (the source color) of the pixel and the destination color of the pixel (the color currently in the frame buffer for the current location). Thus, when the coverage of a pixel is partial, the pixel behind it will blend through. Therefore, graphics processor 5 implements anti-aliasing as a type of alpha blending, which is described further below. However, if one is antialiasing, then one cannot be using alpha blending for other purposes.

Again referring to FIG. 12, four pixel tests 329 are applied to the pixel. The scissoring test tests if the pixels position is outside a defined rectangle in the windows coordinate system. This test is not optional. A failed pixel is not processed any further. The Alpha test compares a pixel's alpha value against a set value. The comparison can be set to any equality or inequality. The effect of failing the test can also be controlled, with the RGB, A, and Z variables can be either not written or written depending on the setting. The destination alpha test compares the alpha of the pixel to the alpha value of the pixel in the same position currently in the frame buffer. A failed pixel is not processed further. The depth test compares the Z value of a pixel against the Z value of the corresponding pixel in the frame buffer. A failed pixel is not processed further. This test essentially implements Z-buffering. The other tests provide a game developer with a multitude of possible pixel manipulations to create new graphical effects.

Alpha blending 331 generates an output color based on the depth test output color generated above (Source Color or Cs), and the color of the pixel in the same position in the frame buffer (destination color, or Cd). The basic calculation is $$\text{Final Output Color} = \{[(Cs, Cd \text{ or } 0) - (Cs, Cd \text{ or } 0)]*(As, Ad, FIX0)\} + (Cs, Cd, \text{ or } 0)$$

where X*Y=(X×Y)>>7. Thus a multitude of calculations are possible, all allowing different sorts of blending between the source and destination color in an amount depending on the value of alpha. In the specific case of antialiasing, the formula reduces to Cs*As+Cd*(0×80−As).

Graphics processor 5 will then send these values for a final formatting at block 333. The RGB values of the pixel will be dithered if they are to go to the frame buffer in RGBA16 format. If after alpha blending, the value of RGB is beyond the accepted value then a color clamp is applied to bring the values into range. Alpha values for pixels can be corrected to a preset value. The pixels are then format converted, packed into a number of bits specified by the developer (RGBA32, RGBA24, or RGBA16). The pixel values of RGBA are written to the frame buffer, and the pixel Z values are written to the Z buffer. Cathode ray tube controller 315 (FIG. 11) will then convert the frame buffer into the appropriate standard signal for a monitor.

Input output processor (IPO) 9 (FIG. 1) serves multiple functions in the computer system 1. Input output processor 9 is a complete 32-bit CPU in its own right. This architecture provides backward compatibility with earlier game systems. Input output processor 9 also manages all input and output data for the primary processor 3, except for the output to the video monitor. Input output processor 9 can deal with USB, IEEE1394, and other standard input and output data.

Sound processor unit (SPU2) is a sound synthesis processor, which is composed of two cores and equipped with local memory and external I/O. The two cores have the following functions: (1) reproduce the sound data input successively from the host; (2) process voices; (3) output the voice-processed sound data to the host successfully; and (4) perform digital effects processing. The two cores, CORE0 and CORE1, are functionally equivalent, and are connected to each other such that the output of CORE0 is the input to CORE1, and the output of CORE1 is the final mixed sound signal. The functional blocks of the SPU include: (1) the host interface; (2) the register RAM; (3) the CORE0; (4) the CORE1; (5) the memory interface; (6) the local memory; and (7) the output block. The Host Interface is connected by the a 32-bit bus to the IOP. The register RAM sets the function of the SPU2. All the registers are 16-bits in width. The local memory is 2 Mbytes of RAM. The local memory is divided into four functional areas: (1) the sound data input area; (2) the sound data output area; (3) the waveform data area; and (4) the digital effect work area. The sound data input area has data written in by the host, and outputted to the SPU2 cores. The sound data output area is buffer in this area, and is read by the host. The digital effect work area is in fact two areas used by the cores as scratch space for digital effect delay processing.

The preferred embodiments described above include numerous variations and combinations which are within the spirit and scope of the invention. The foregoing description should be understood as an illustration of the invention, therefore, rather than as a limitation. The scope of the invention is described by the following claims.

What is claimed is:

1. A system for rendering pixels comprising:
a frame buffer defined by orthogonal x and y coordinates;
a processor for rendering pixels within said frame buffer, said rendering comprising (1) selecting a polygon for rendering within said frame buffer, (2) defining the x and y coordinates of the vertices of a rectangular stamp comprising a fixed number of pixels such that said rectangular stamp is positioned at a first location within at least a first portion of said polygon, (3) rendering the pixels within said rectangular stamp at said first location, (4) moving said rectangular stamp from said first location to a second location within at least a second portion of said polygon, the x coordinates of the vertices of said rectangular stamp at said second location being different from the x coordinates of the vertices of said rectangular stamp at said first location, (5) rendering the pixels within said rectangular stamp at said second location, (6) successively repeating steps (4) and (5) until all of the pixels within said polygon are rendered.

2. A system as in claim 1, wherein said fixed number of pixels is 16 pixels.

3. A system as in claim 1, wherein said processor renders the pixels within said rectangular stamp at each of said locations in one clock cycle of said processor.

4. A system as in claim 1, wherein said polygon is a triangle.

5. A system as in claim 1, wherein said system is a machine for playing a computer game, and said polygon is a primitive of an object of said computer game.

6. A method for rendering pixels comprising:

providing a frame buffer defined by orthogonal x and y coordinates;

rendering pixels within said frame buffer, said rendering comprising (1) selecting a polygon for rendering within said frame buffer, (2) defining the x and y coordinates of the vertices of a rectangular stamp comprising a fixed number of pixels such that said rectangular stamp is positioned at a first location within at least a first portion of said polygon, (3) rendering the pixels within said rectangular stamp at said first location, (4) moving said rectangular stamp from said first location to a second location within at least a second portion of said polygon, the x coordinates of the vertices of said rectangular stamp at said second location being different from the x coordinates of the vertices of said rectangular stamp at said first location, (5) rendering the pixels within said rectangular stamp at said second location, (6) successively repeating steps (4) and (5) until all of the pixels within said polygon are rendered.

7. A method as in claim 6, wherein said fixed number of pixels is 16 pixels.

8. A method as in claim 6, further comprising performing said method with a processor that renders the pixels within said rectangular stamp at each of said locations in one clock cycle of said processor.

9. A method as in claim 6, wherein said polygon is a triangle.

10. A method as in claim 6, wherein said method is performed for playing a computer game, and said polygon is a primitive of an object of said computer game.

* * * * *